United States Patent [19]

Bettencourt et al.

[11] Patent Number: 4,662,162

[45] Date of Patent: May 5, 1987

[54] TOMATO HARVESTER

[76] Inventors: Thomas S. Bettencourt, 142 W. Tyler Island Bridge Rd., Isleton, Calif. 95641; Darryl G. Bettencourt, 610 Carignane Ct., Lodi, Calif. 95240

[21] Appl. No.: 826,216

[22] Filed: Feb. 5, 1986

Related U.S. Application Data

[63] Continuation-in-part of Ser. No. 584,823, Feb. 29, 1984, Pat. No. 4,584,826, which is a continuation-in-part of Ser. No. 469,003, Feb. 23, 1983, abandoned.

[51] Int. Cl.$^4$ ............................................. A01D 46/00
[52] U.S. Cl. .................................... 56/327 R; 56/14.9; 56/15.1; 56/15.4
[58] Field of Search ...................... 56/11.9, 14.7, 14.9, 56/15.1, 15.2, 15.3, 15.4, 15.5, 15.6, 15.7, 16.5, 27.5, 218, 228, 327 R, 328 R

[56] References Cited

U.S. PATENT DOCUMENTS

| 1,646,455 | 10/1927 | Johnson et al. | 56/15.4 |
|---|---|---|---|
| 2,615,294 | 10/1952 | Dray | 56/218 |
| 2,806,337 | 9/1957 | Rezabek | 56/15.4 |
| 4,037,395 | 7/1977 | Henkensiefken | 56/218 |
| 4,046,399 | 9/1977 | Zeuner et al. | 56/15.6 |
| 4,332,128 | 6/1982 | Prince | 56/218 |
| 4,418,518 | 12/1983 | Koch et al. | 56/15.5 |
| 4,584,826 | 4/1982 | Bettencourt et al. | 56/10.2 |

Primary Examiner—John J. Wilson
Assistant Examiner—John G. Weiss

[57] ABSTRACT

A single-row tomato harvester. A tractor fully supported on its own wheels, has its wheels being spaced apart sufficiently to bridge a previously harvested bed and ride in its furrows. The tractor has its own hydraulic pump, a power take-off unit along the tractor's longitudinal centerline, and a rigid draw bar at its rear. A harvester assembly having no motive power is partially supported on wheels spaced apart widthwise at substantially the same distance as those of the tractor and has a series of hydraulically powered means. The harvester is offset by one bed from the tractor during harvesting. A tongue pivotally attached at one end to the harvester and the other end to said tractor, supports a hydraulic pump for operating the harvester's series of powered means. A longitudinally rigid drive line, swivel mounted to said pump's rotary shaft and to the tractor's power take-off unit, has telescoping means for automatically lengthening and shortening it. The drive line lies along the centerline of the tractor during the offset harvesting. A hydraulically powered generally horizontal cylinder-piston apparatus is pivotally attached at one end to said tongue and at the other end to the harvester for shifting the relative lateral position of the harvester assembly to the tractor.

15 Claims, 21 Drawing Figures

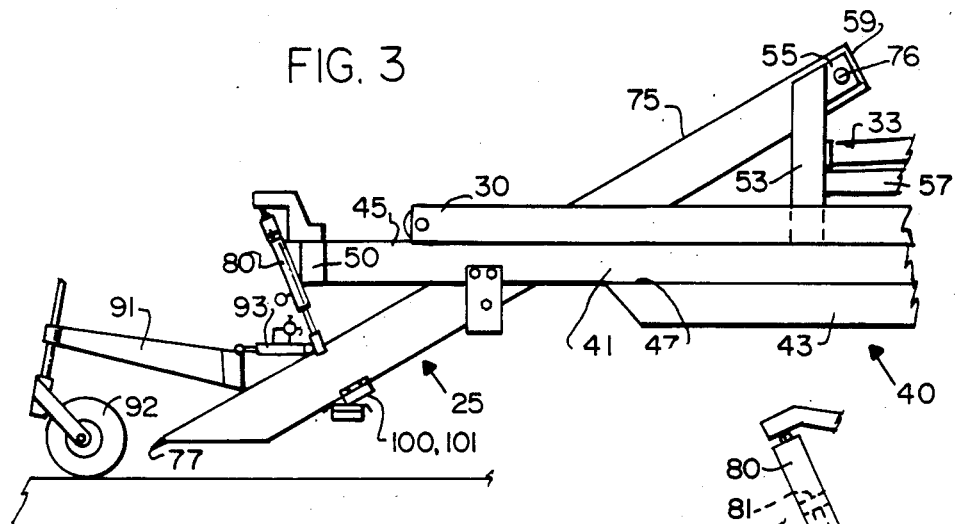
FIG. 3
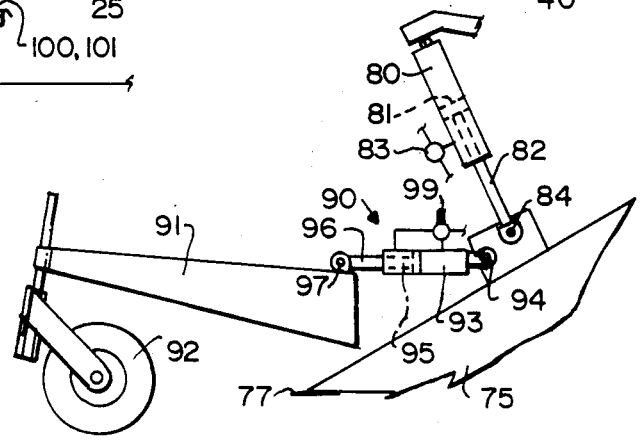
FIG. 3-A
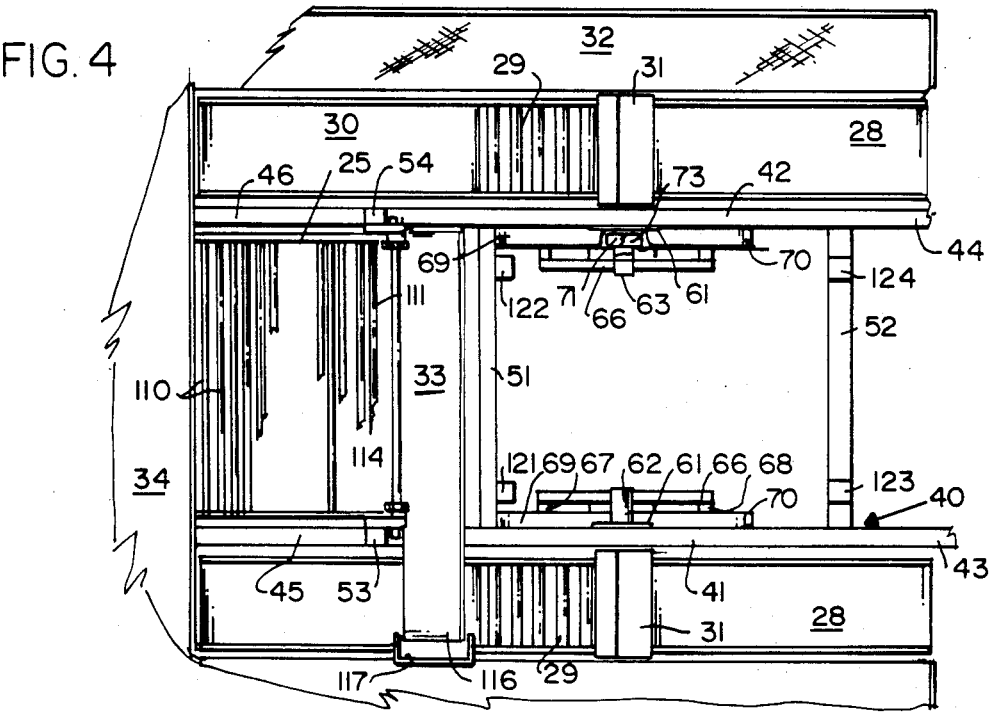
FIG. 4

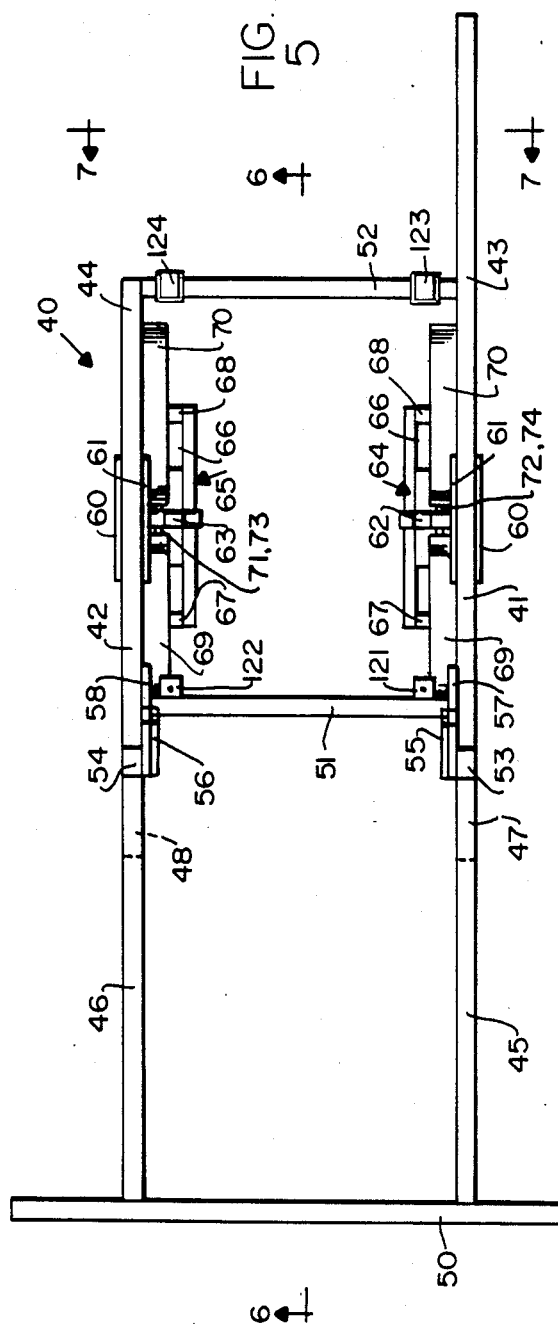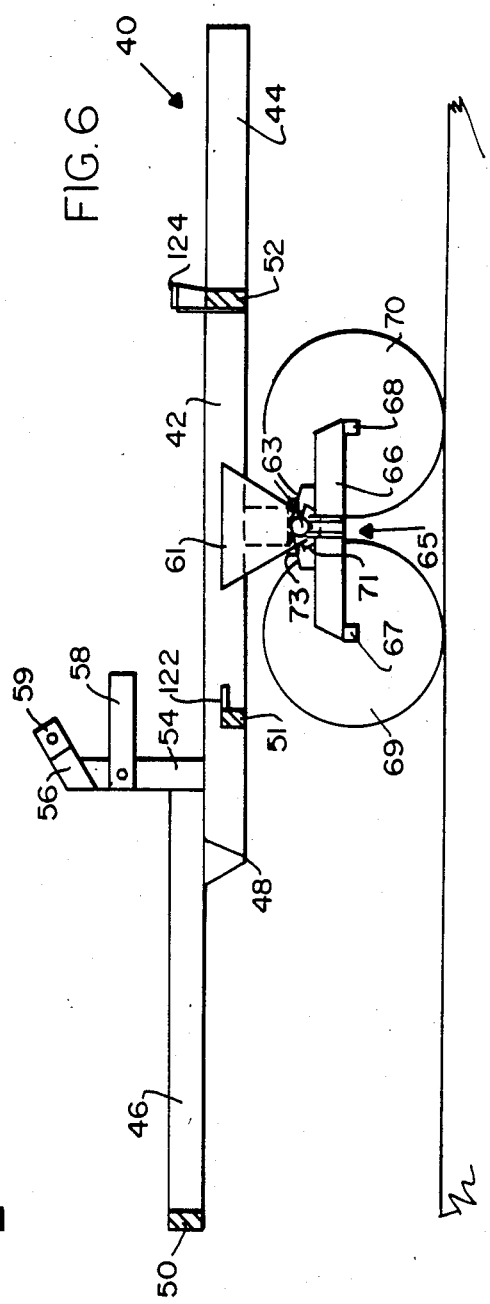

TOMATO HARVESTER

REFERENCE TO RELATED CO-PENDING APPLICATION

This invention is a continuation-in-part of application Ser. No. 584,823, filed Feb. 29, 1984, now U.S. Pat. No. 4,584,826, which was a continuation-in-part of application Ser. No. 469,003, filed Feb. 23, 1983, now abandoned.

BACKGROUND OF THE INVENTION

This invention relates to improvements in tomato harvesters and tomato harvesting.

At present, tomato harvesters are very expensive, their price, as of 1982, approaching $200,000.00 per harvester. One reason why they are expensive is that a large proportion of the cost of each harvester is the cost of the engine, its support structure, and its related parts for propelling the harvester and its moving parts; for all current commercial tomato harvesters are self-propelled, partly so that the operator controlling the tractor's forward movement through the field can also control the depth at which the tomato plant stems are severed and the amount of dirt taken up by the harvester's pickup.

The high cost of harvesters has meant that farmers with relatively small areas planted in tomatoes have been unable to take advantage of efficient mechanical harvesting, unless they could do so cooperatively or from someone who owned a harvester and was willing to lease it or rent it to them or to use it for them in their fields. (Currently available tow-type harvesters, such as there are, have been small, low capacity machines.) Since all the tomatoes in a given agricultural area tend to ripen at about the same time for mechanical harvest, this has caused difficulties in scheduling and allocating harvesters among the smaller farms. Even for the larger farms the numbers of harvesters that could be afforded for large plantings of tomatoes was limited by the cost of the harvesters and by the cost of operating them.

Another problem of the self-propelled harvester, has been that they have had to be very heavy. Their weight made it expensive to freight them from one location to another, increased the fuel cost during operation, and also caused the harvesters to bear heavily on the soil in the field, especially, when that soil had been softened by a rain.

Even when the conditions were good for harvesting, the axles for the wheels of the harvester were low to the ground and could easily sink down into contact with the ground. Furthermore, the self-propelled harvesters have had numerous cross members, including not only the wheel axles but other parts which have often been so low as to lie only 12 to 18 inches above the ground on hard soil, and since the wheels are usually run in furrows on each side of a raised bed, and since the furrows are typically six to eight inches deep, the cross members are often as low as four to twelve inches above the ground in the bed, and when the wheels sink into the dirt in the furrows, this distance is even further lowered. It has therefore been difficult to complete harvesting when the soil has been softened as by rain, and even worse when the soil is somewhat muddy, for then the mud has tended to build up on these cross members and rather frequent stops had to be made to clean them off.

Another problem with the self-propelled harvesters has been that they have had a long turning radius, because of their long wheelbases. Farmers like to utilize their fields to the full, but when harvesters require a substantial amount of maneuvering room, some crop acreage has to be sacrificed and also time is wasted during the maneuvering when moving from the end of one row to the beginning of a succeeding row. Unfortunately, prior-art tow-type harvesters have had even longer turning radii, due to the combined length of their tractors and trailers. A simple pivoting tongue connection between the tractor and trailer is not enough to shorten the turning radius sufficiently.

The problem of providing an efficient tow-type harvester is complicated by the great desirability of using the tractor's power take-off unit to drive the hydraulic pumping mechanism that operates all the operating systems of the harvester. For example, Cortopassi et al. show in U.S. Pat. No. 4,147,017 a towed unit that produces all its own power; this is wasteful and inefficient; it avoids problems relative to the use of a tractor power take-off unit, but at the great loss of the economy that could thereby be obtained. Cortopassi et al. use the tractor only for pulling the tractor. Cortopassi et al. provide a two-row harvester that can shift over by the width of one row. How they avoid the tractor's destroying the crop in the row where it precedes one-half of the harvester is not clear. Although their patent shows a pivoting tongue, it also extends the trailer length instead of doubling back after the fruit separation and so provides a harvester having quite a long overall turning radius.

As another example, Porter in U.S. Pat. No. 3,999,613 shows a trailer-harvester that does use the tractor's power take off unit to drive the moving systems, but the relation between the harvester trailer and the tractor is fixed. The attachment of the tongue to the tractor draw bar is not a pivotal attachment, nor is there a pivot where the tonque is attached to the tractor, nor are there any hydraulic devices for varying the position of the trailer to the tractor. This is largely because of the necessity here of keeping the power take-off drive shift rigidly aligned with the tractor's power take-off unit. This results, among other things in a very long turning radius related to the combined length of the trailer and the tractor.

OBJECTS OF THE INVENTION

An important object of this invention is to provide a tractor-trailer harvester with a very short turning radius, requiring less room than even a comparable self-propelled harvester when making turns or going from the end of a harvested row to the beginning of the row next to be harvested. The harvester can turn to the right as well as to the left.

Another object of the invention is to provide a connection between the tractor and trailer that enables use of the tractor's power take-off unit to drive all of the moving parts of the trailer-harvester, while still enabling the connection to be pivoted and variable. This involves the use of a novel connection system which enables the drive system from the power take-off unit to be in line with the tractor centerline while the pump is driven—during harvesting—and to pivot when turns are made or the harvester is towed directly behind the tractor. Harvesting is done with the trailer offset from the tractor by one row, so that the tractor moves over an already harvested row.

Another object of the invention, thus, is to provide a tomato harvester which can be drawn through the field during harvesting by a standard tractor. A related object is to enable the tractor to be offset from the harvester so that the tractor does not ride over the bed being harvested, but rather to one side of it, over a bed that has been previously harvested, or at an end of the field over unplanted space.

Another object of the invention is to provide a harvester employing a tractor that spans a single row of tomatoes,—i.e., spans one tomato bed while its wheels ride in the furrows that bound the bed on opposite sides,— in combination with a harvester having its wheels the same distance apart as those of the tractor. Furthermore, the harvester and the tractor are so connected together that the harvester can be offset relative to the tractor. As a result, the harvester can harvest a previously unharvested row or bed of tomatoes while the tractor, offset therefrom, rides over an already-harvested bed; therefore the tractor does not damage the unharvested tomato beds.

Another object is to provide a very maneuverable tractor-harvester combination that can be expanded or contracted in overall width between direct trailing and offsetting.

Among other objects of the invention are to make it possible to provide much less expensive tomato harvesters—harvesters which may cost as little as half what comparable self-propelled harvesters cost, while still retaining the high capacity of a self-propelled machine. It also makes it possible to reduce the cost of operation of the tomato harvester in the field.

Another object of the invention is to reduce the weight of the tomato harvester so that it takes less power to move it through the field and makes it more feasible to harvest wet or otherwise softened fields.

Another object of the invention is to eliminate cross members in the harvester up to a considerable height. This height of the lowest cross members may be as high as forty inches or possibly even higher. No cross members are likely to come into contact with the soil, other than the wheels and the sickle at the front end of the pickup unit, which is intended to operate below the surface of the soil.

A similar object is to eliminate the cross members below the separator unit, on which, heretofore, organic matter, soil, and tomato juice from discarded or culled tomatoes have tended to build up.

Another object of the invention is to provide a drawn harvester unit, which can incorporate automatic height control of the pickup unit and its sickle.

Other objects and advantages of the invention will become apparent from the following description of a preferred embodiment.

SUMMARY OF THE INVENTION

The invention provides a single-row tomato harvester for harvesting a row crop planted in parallel beds of identical width defined on each side by a furrow.

It includes a tractor fully supported on its own wheels. The wheels are spaced apart widthwise at a distance sufficient to bridge a planted bed and ride in its furrows. The tractor has its own motive power plus a power take-off unit fitted with a universal joint. It also has a rigid draw bar extending rearwardly from its rear end along the tractor's longitudinal center line.

The harvester assembly has no motive power, all its moving systems being driven by the tractor's power take-off unit. It has a main frame partially supported on wheels spaced apart widthwise at substantially the same distance as those of the tractor. Its main frame supports powered pickup means, powered separator means, and powered conveyor means. There is hydraulic means on the harvester assembly for operating all these powered means, including a pump having a rotary shaft and telescoping apparatus for connecting that shaft, through one universal joint, to a second universal joint of the tractor's power-take-off unit. The attachment of the power take-off unit is also detachable, so that the tractor can be detached and used for other purposes.

A tongue is pivotally attached at its rear end to the front end of the main frame and is detachably pivotally attached at its front end to the draw bar of the tractor. This tongue comprises the sole structural member tying together the harvester assembly and the tractor. In this invention, the tongue may be made in two main parts—a tow arm and an offset bracket. The tow arm is pivotally attached to the main frame, so that it can achieve the desired one-row offset during harvesting. The tow arm extends forwardly from the front of the harvester assembly and, during non-harvesting towing may lie along or nearly along the assembly's longitudinal centerline. However, the tongue may then diverge from that centerline at a small angle, and, if so, the offset coupler bracket, which is pivotally attached to the draw bar closely adjacent to the rear end of the draw bar and is rigidly attached to the front end of the tow arm, may be attached to the tow bar at an obtuse angle in order to provide the proper alignments. Adjustment means at the offset coupler bracket enable vertical adjustments that level the harvester with respect to the tractor.

The heavy hydraulic pump is supported by a strong pump-supporting bracket. The pump-supporting bracket is connected to the tow arm and can be adjusted relatively to the tow arm, so as to position the pump properly relative to the power-take-off unit.

A longitudinally rigid drive line, swivel mounted at one end of the pump's rotary shaft and at its other end to the power take-off unit of the tractor, includes telescoping means for automatically lengthening and shortening the drive line during turning of the harvester.

It is important that, during harvesting, the drive line be substantially in line with the longitudinal centerline of the tractor. In other words, the power take-off of the tractor, the drive line, and the pump shaft should all be substantially in one straight line while the pump is being driven, a slight tolerance being permissible. Otherwise, the bearings at each end of the drive line would be unduly worn. Whenever a turn is made by the tractor-trailer combination, resulting in swiveling at either or both ends of the drive line, the power take-off unit of the tractor is turned off, and the pump is not driven. This also happens when the harvest is being towed at any other than its offset, harvesting position. The present invention enables this to be done.

The tongue is sufficiently long, so that while the harvester assembly can trail directly behind the tractor, for moving to and from a field, the harvester assembly may also be offset by one bed to the left side of the tractor. As a result, the tractor runs over an already harvested bed while the harvester assembly harvests along the adjacent bed to the left of the tractor and delivers fruit to a vehicle on the right side of the tractor.

The new combination drastically reduces the turning radius of the tractor-trailer combination, thereby greatly increasing the efficiency of the overall device.

An hydraulically powered, generally horizontal cylinder-piston means, pivotally attached at one end to the tow bar and at the other end to the main frame, can shift the relative laternal positions of the harvester assembly to the tractor, from a position where the harvester assembly is offset at least one full row to the left of the tractor to a position where the harvester assembly is aligned with the tractor and therebeyond. It can also take any position in between. As a result, the radius of turning of the tractor-harvester assembly combination is reduced greatly for a turn in either direction. Since the harvester assembly harvests one bed while the tractor passes over the adjacent, already harvested bed, the unharvested beds are not damaged.

This tongue positioning cylinder-position means is one of the four parts on the harvester assembly that is driven by the tractor's own hydraulic system rather than by the power take-off and harvester pump, so that it can be operated regardless of the current alignment of the drive line. Another part driven by the tractor's hydraulic system is the device for lifting the pick-up's conveyor, the conveyor itself being driven by the pump and operated only during harvesting.

Preferably, a non-powered telescoping assembly is pivotally attached at one end to the main frame and at the other end to the tow arm, to divide the load on, to guide, and to limit the maximum extension of the cylinder-piston assembly. This telescoping assembly also has specially located holes through its telescoping members and a removable pin for use therewith, so that the telescoping assembly can be locked in a position where the harvester assembly is offset one row from the tractor, for harvesting, or in another position axially in line with the tractor for non-harvesting towing. Therefore, when the locking pin is in place, hydraulic pressure need not be applied to the cylinder-piston assembly.

BRIEF DESCRIPTION OF THE DRAWINGS

FIG. 3 is a view in side elevation of a portion of the pickup unit at the front of the harvester assembly, showing a typical location for the control device of the automatic height control device.

FIG. 3A is an enlargement of a portion of FIG. 3 relating to the hydraulic cylinders.

FIG. 4 is a fragmentary top plan view of a portion of the harvester assembly, with the separator unit removed to show what lies below it.

FIG. 5 is a top plan view of the main frame of the harvester assembly together with its wheel support unit and wheels.

FIG. 6 is a similar view in side elevation and in section taken along the line 6—6 in FIG. 5.

FIG. 16 shows the tractor-harvester combination just finishing with one row; already harvested rows lie to the right, and unharvested rows lie to the left.

FIG. 17 shows how the tractor harvester combination leave the just harvested row, so that the wheels do not come into the unharvested row just to the left.

FIG. 18 shows the tractor-harvester combination going down a limited-spaced headland.

FIG. 19 shows the combination turning from the headland into a row to be harvested, and FIG. 20 shows the tractor and harvester ready to enter the next row to be harvested.

DESCRIPTION OF A PREFERRED EMBODIMENT

Figure 1:
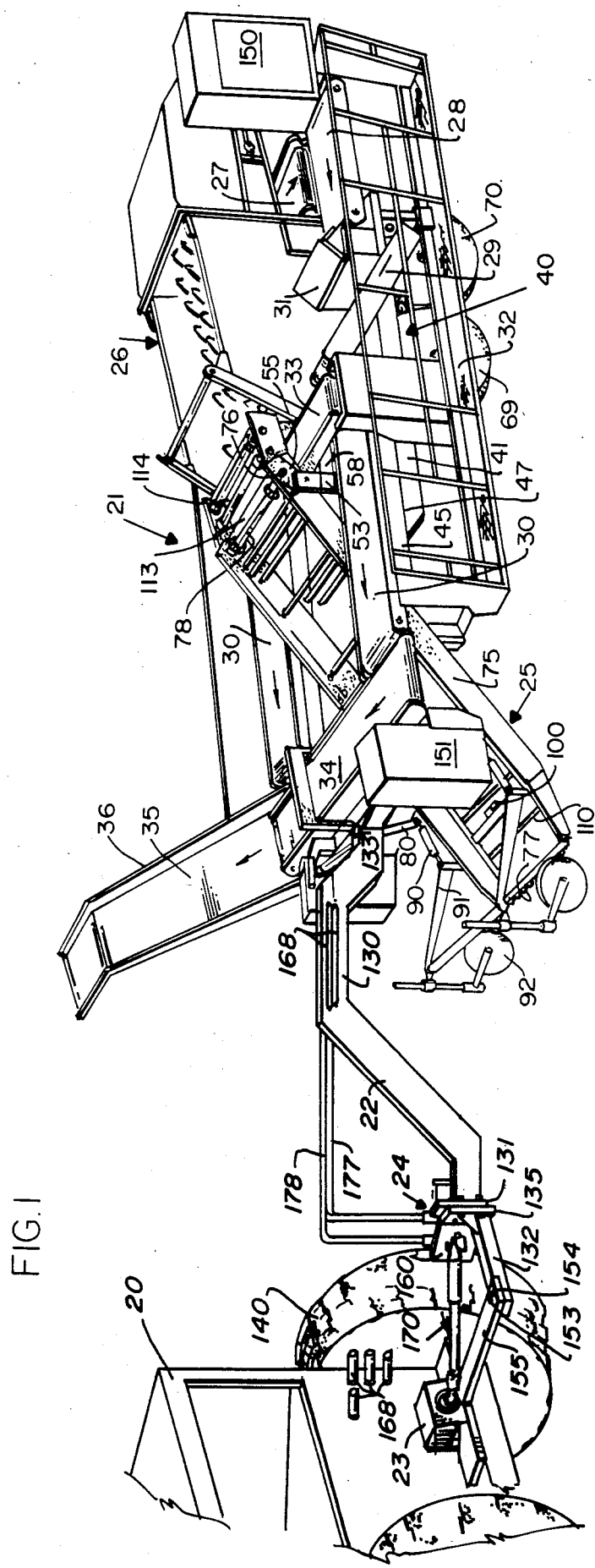
FIG. 1 is a view in perspective of a tomato harvester embodying the principles of the invention, and comprising a tractor pulling a harvester assembly, the front of the tractor being broken off to conserve space.
Figure 2:
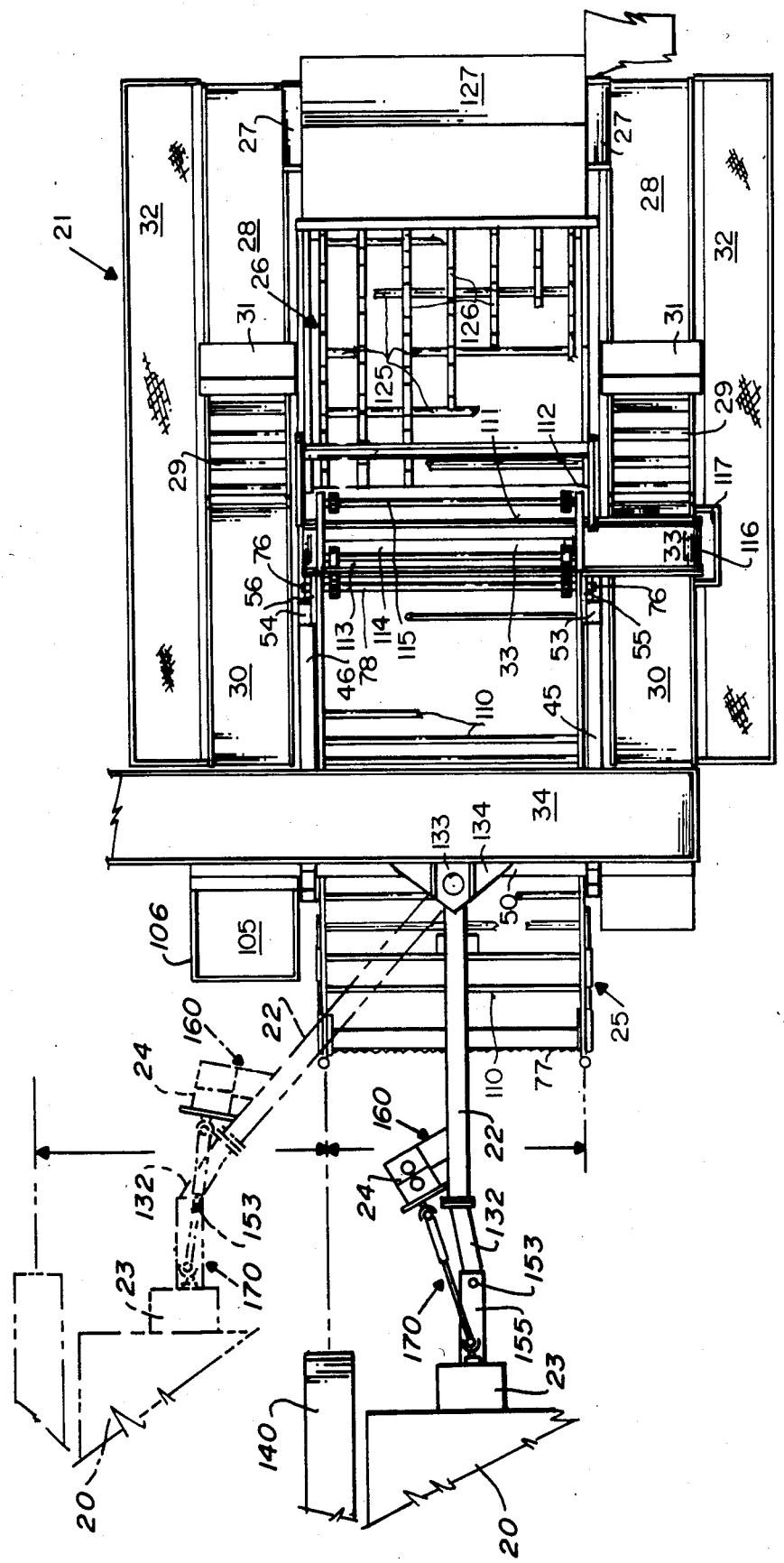
FIG. 2 is a top plan view of the conveyor of FIG. 1 with portions of the rear of the harvester assembly and the front of the tractor being broken off to conserve space. In broken lines the tractor is shown in an offset position as it is used for harvesting, and in solid lines is shown in the straight-on position which is used when moving the harvester from one field to another, as along or beside roadways.

General description (FIGS. 1 and 2)

The drawings show an embodiment of the present invention which illustrates the principles of that invention. It is apparent that there can be changes in many parts of the device without departing from the spirit and scope of the invention as stated in the claims at the end of the application, but the example will make it easier to understand the purpose of the invention and how it can be carried out.

As shown in FIGS. 1 and 2, the invention preferably comprises a standard single-row-spanning tractor 20 and a non-self-propelled single-row-spanning harvester assembly 21. The two are connected together by a tongue 22, which is especially made in two major components and will be described below. This tongue 22 is made sufficiently long so that the harvester assembly 21 may be offset by a full row to either side of the tractor 20. Power apparatus, explained below, enables this to be done and enables the change in relative position needed to vary between offsetting and direct trailing and intermediate positions during maneuvering at the ends of rows.

The tractor 20 may be of any suitable type; it may be separately acquired and used for other work; many types of agricultural tractors are suitable. The tractor 20 provides the motive power for the harvester 21 and has a power take-off device 23 for the hydraulic system of the harvester 21.

Figure 9:
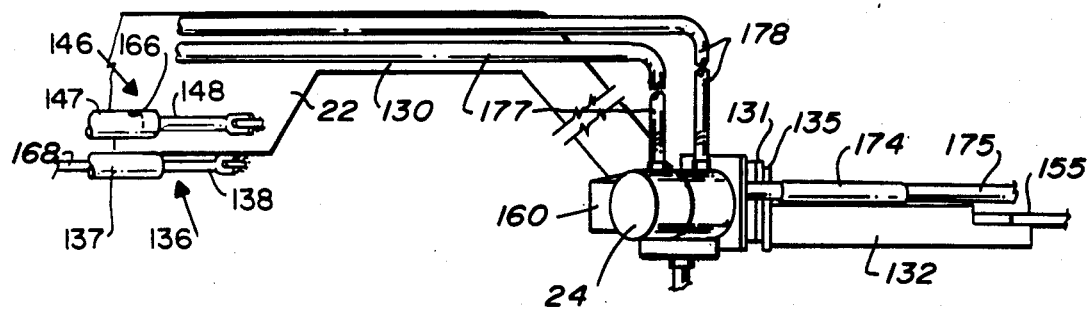
FIG. 9 is a fragmentary view in side elevation of a preferred tongue structure broken in the middle for linking the harvester assembly to the tractor.

Preferably, the power take-off device 23 supplies 155 horsepower at 1000 r.p.m. Its connection may be a 1-3/8-21 involute spine. A pump 24 for the hydraulic system is preferably located on a front portion of the tongue (See FIG. 9) and is detachably connected to the power take-off device 23 by a novel drive arrangement described below. The heavy pump 24 should have a maximum pressure of about 1500 p.s.i. and be able to pump about 108 gallons per minute at 1000 r.p.m.

As shown in FIGS. 1 and 2 the harvester assembly 21 includes all the basic units of contemporary tomato harvesters, being similar in many ways to the standard UC-Blackwelder harvesters. Thus, the assembly 21 includes a pickup unit 25, a separator unit 26, and suitable conveyor systems and sorting mechanism which deal with the separated tomatoes, including rear cross-conveyors 27, forwardly moving conveyors 28, 29, and 30 at each side of the unit, electric mechanical sorters 31 and personnel-holding platforms 32 on each side of the unit, a clod conveyor 33, a front cross-conveyor 34, and a delivery system 35 on an outboard support structure 36. In fact, in most instances these units may be identical to what it used in current models of the UC-Blackwelder tomato harvesters.

Figure 7:
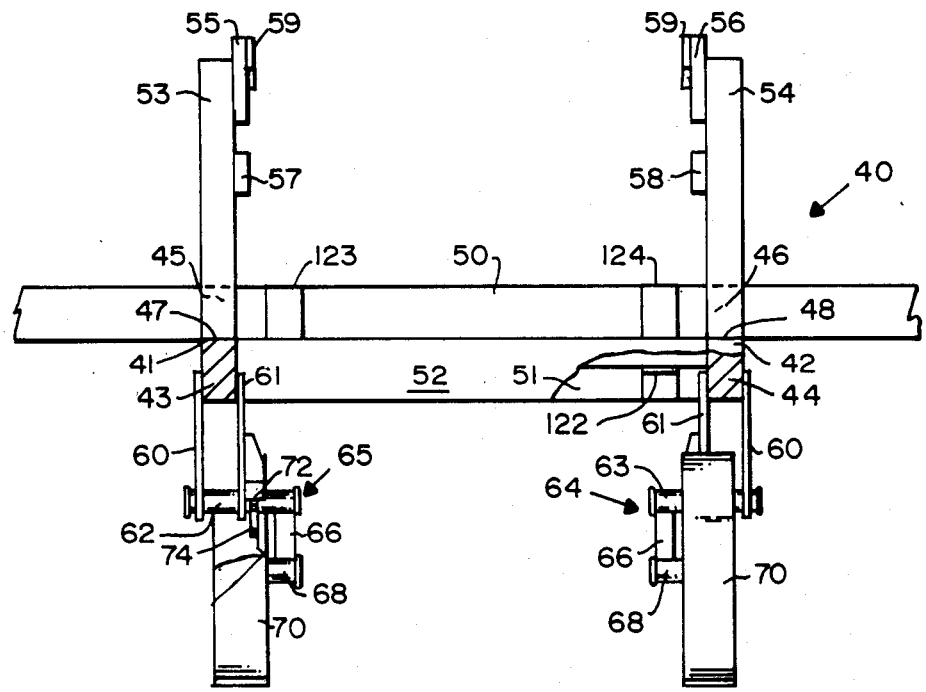
FIG. 7 is a view in section taken along the line 7—7 in FIG. 5, with some portions cut away and shown in section.

The main frame 40 (FIGS. 5-7)

All these units are carried by a novel and significantly different main frame 40, and are assembled thereon in a novel manner. The main frame 40 is best shown in FIGS. 5-7 and comprises two longitudinally extending beams 41 and 42, the beam 41 being somewhat longer and extending further to the rear than the beam 42, for a purpose to be described later. Each beam 41, 42 is preferably made stepped to provide a rear portion 43, 44, respectively, and a forward portion 45, 46, respectively, the forward and rear portions overlapping and welded together at 47, 48. The purpose is to make simpler the mounting of the various units on the frame 40 at their proper heights.

These two beams 41 and 42 are joined together transversely by three cross members 50, 51, and 52, there being a front cross member 50, which is longer than the other two and extends beyond the beams 41 and 42 on both sides, an intermediate cross member 51, and a rear cross member 52 at the rear end of the shorter beam 42. There are no other structural cross frame members in between the beams 41 and 42.

The main fame 40, as described, is preferably made to lie substantially on a single plane. By "substantially", what is meant is that the stepping of the two longitudinal beams 41 and 42 results in departure from a strict plane, but not much; the cross members 50, 51, and 52, too are not precisely co-planar, but again are nearly so. This main frame 40 supports various frame superstructures, not all of which is shown in FIGS. 5-7. These figures do show a pair of vertical support pillars 53 and 54 near and preferably forward of the intermediate cross-member 51. The pillars 53 and 54 each carry an angle bracket 55 or 56 at its upper end, preferably tilted rearwardly, and also preferably carry a pair of support blocks 57, 58 for the clod conveyor 33, as described below. Each angle bracket 55, 56 carries a strengthening member 59 at its upper end.

In between the intermediate cross member 51 and the rear cross member 52, a pair of brackets 60 and 61 are secured to each of the frame beams 41 and 42, one on the outside and one on the inside of each beam 41, 42. The brackets 60 and 61 may be generally triangular, inverted, and extend downwardly. While these brackets 60 and 61 may be secured so that they are movable fore-and-aft as an assembly along the beams 41 and 42, as by slots and bolts, usually they are each welded directly to the beam portions 43 and 44. Each bracket pair 60, 61 pivotally supports by means of a stub shaft 62 or 63, a truck assembly 64 or 65, each comprising a fore-and-aft extending truck frame member 66 (such as a four-by-six inch steel tube), supporting near its ends a forward stub shaft or axle 67 and a rear stub shaft or axle 68. On their respective stub shafts 67, 68 the truck's two wheels—a front wheel 69 and a rear wheel 70 are mounted to each side of the assembly 21. Note that each wheel 69, 70 is mounted on a separate stub shaft 67 or 68, and that there is no axle that goes across between the pair of wheels 69 or between the pair of wheels 70. Each truck 64, 65 is supported pivotally by its stub shaft 62 or 63 and is provided with a pair of stop members 71 and 72 which cooperate with stop portions 73 and 74 of the bracket pair 60, 61 to prevent the pivotal action from raising either wheel 69 or 70 too high relative to the other.

It will be noted that the entire main frame 40, except for its brackets 60, 61 lies above the top of the wheels 69 and 70, and it has no members which go down lower than the stub shafts 67, 68 about which the wheels 69 and 70 rotate. This fact is also shown in FIG. 4, and it will be seen that as a result, anything that drops from the separator unit 26 cannot collect on cross members, and also that no matter how soft the field is, this harvester assembly 21, which is necessarily substantially lighter than previous self-propelled tomato harvesters, due to the fact that it carries no engine and associated parts, is not impeded in any way by low cross members that could possibly get into contact with the ground.

The pickup unit (FIGS. 1-4 and 8)

The pickup unit 25 has a pickup frame 75 which is pivotally attached by pivot members 76 (FIG. 2) to the angle brackets 55 of the support pillars 53 and 54, somewhat forward of the separator unit 26. The forward end of the pickup frame 75 carries a cutter, preferably a powered sickle 77 and is lifted and lowered relative to the frame 40 by a pair of hydraulic cylinders 80 (see FIG. 3), each secured pivotally to the beam 41 or 42, with a piston 81 having a piston rod 82 secured pivotally to the frame 75.

The lifting is provided by swinging up the header frame 75 under hydraulic power from the tractor's hydraulic system, the header frame 75 swinging about its pivots 76, which are at opposite ends of a shaft 78 relative to the main frame 40; downward movement is accomplished by release and by gravity. As in application Ser. No. 363,642 a suitable valve 83 which may be controlled manually by the tractor operator to send fluid into one side of the hydraulic cylinder 80 in order to raise the header frame 75 relative to the main frame 40, lowering being accomplished by release of hydraulic pressure and gravity. The manual control (1) places the hydraulic valve 83 in detented position for automatic operation and (2) lifts the header at the ends of rows.

Figure 8:
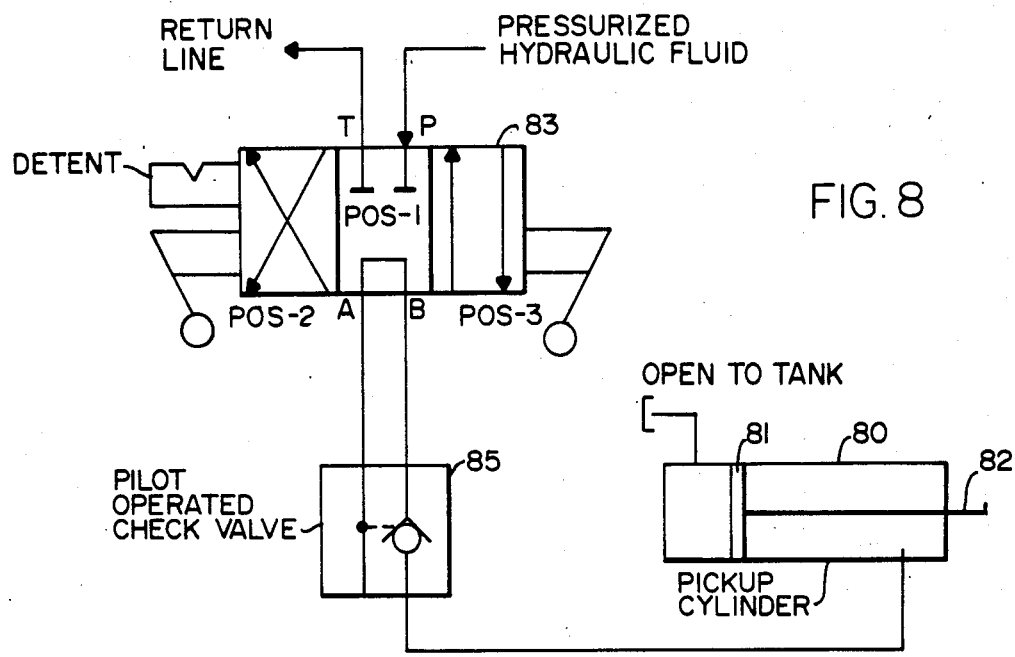
FIG. 8 is a hydraulic circuit diagram showing how the header is placed in a free-floating condition.

FIG. 8 shows that the valve 83 is a three-position four-way valve, having an inlet port P for pressurized hydraulic fluid, an outlet return-line port T, and ports A and B that are connected to a pilot-operated check valve 85. In its first position, the port P is dead-ended, the port T is not connected to any other port, and the ports A and B are connected to each other. This position holds whatever pressure there is applied to the piston 81 in the cylinder 80.

In position two, the detented position, the port P is connected to the port A, the port B is connected to the port T, and the check valve 85 is opened. Thus, no pressure is exerted against the piston 81 in the rod side of the cylinder 80; since the opposite side of the cylinder 80 is open to the return line, there is no pressure on either side of the piston 81, and the header frame 75 can float freely.

In position 3, the port P is connected to the port B, sending fluid to force the check valve 85 off its seat and apply pressure to the rod side of the cylinder 80. The return port T is connected to the port A. The fluid on the rod side of the cylinder 80 therefore actuates the piston 81 to lift the header frame 75.

During actual harvesting, the valve 83 is in its detented position, and the pickup unit or header 25 is therefore in a free-floating condition. A telescoping assembly follows the piston rod movement and is used in conjunction with a transducer to indicate the amount of movement, which is proportional to the height of the sickel 77 relative to the main frame 40.

A similar hydraulic device 90 may be used to swing the header frame 75 and a gauge frame 91 relatively to each other. On the gauge frame 91 are mounted gauge wheels 92. The gauge wheels 92 do not provide any significant support for the harvester assembly 21, but merely enable the control of the height of the forward end of pickup unit 25 by running in the furrows on each side of the bed to be harvested. This power device 90 may include (see FIG. 3A) a cylinder 93 secured at a pivot 94 to the header frame 75, a piston 95, a piston rod 96 secured to a pivot 97 on the gauge frame 91, a valve 98, and a solenoid 99 for the valve 98. Typically, the header frame 75 moves relative to the gauge wheel frame 91, since the gauge wheels 92 are preferably kept seated in the furrows, and the valve 83 is in the detented position so that the header 25 floats freely and does not oppose the adjustments. Thus, the solenoid 99 controls the height of the cutting-sickle 77 in relation to the ground, acting through the valve 98 and the hydraulic device 90.

As explained in co-pending patent application Ser. No. 469,003, filed Feb. 23, 1982, now abandoned and in co-pending patent application Ser. No. 569,207, filed Jan. 9, 1984, now U.S. Pat. No. 4,584,826, these hydraulic units 80 may be used in connection with an automatic height control device 100 which is described in detail in these co-pending patent applications. These descriptions need not be repeated here. In either event, the ultrasonic device 100 is mounted in a suitable housing 101 that is mounted on the underside of the pickup frame 75, and determines the distance from itself to the ground level, as compared with that of a calibration bar carried on it, and by calculations made in a suitable microprocessor the hydraulic device 90 is actuated to raise and lower the device 100 (along with the pickup frame 75) and to do so in an amount which compensates for the location of the distance-determining mechanism, relative to the sickle blade 77 which cuts off the tomato plants.

Use of this device is recommended, because with it, the operator need not exercise continuous manual control over raising and lower the pickup unit. However, manual control is quite practical and such an operator may still be desirable as a backup, and also to help in other ways; for that purpose a platform 105 and in a box-like structure 106 are mounted on the main frame 40. There the operator may stand, and, with controls located there, either this operator or the tractor operator may control the times at which the pickup unit 25 is to be lifted high, as when changing rows, or moving along the side of a highway or road. During the harvesting the automatic height control may be employed (by placing the valve 83 in its detent position), to maintain the harvesting efficiency of the device. However, if the automatic control device should become inoperative for any reason, or be unsatisfactory, or not be used for any other reason, the operator on the platform 105 can take over, and if the owner wishes to operate that way and not use such an automatic device, he can do so, too.

The pickup unit 25 includes an elevating conveyor 110, which is preferably an open bar type in order to let dirt drop out between the bars. This elevating conveyor 110, in this device, is operated hydraulically with power from the pump 24. It carries the plants, with the tomatoes still attached, up at a gentle angle of about 30 degrees. This is made possible because of the overall shortened length of the harvester assembly 21, as compared with a comparable self-controlled unit, thereby enabling it to have this gentler angle of pickup which helps to disturb the tomatoes less, and results in fewer tomatoes being cut here. It also gives a somewhat longer run during which loose dirt can fall out to the ground.

The clod conveyor 33 (FIGS. 1–4)

Between the rear end 111 of the elevating conveyor 110 and the front end 112 of the separator unit 26, there is a transfer conveyor 114 operated by power from the pump 24, providing open spaces 113 over which the plants pass and including rollers 115. Beneath the spaces 113, which may be adjusted for size, is the clod conveyor 33, the frame for which may be mounted directly on the intermediate cross member 51. The clot conveyor 33 (like the clod conveyor in U.S. Pat. No. 4,118,311) crosses from one side of the harvester assembly 21 to the other and collects from that space all loose tomatoes, loose clods of dirt, loose trash, and any remaining loose dirt and carries them out preferably to one side of the harvester 21, (though, of course, the conveyor 33 could be made in two units to move out of each side, but that is unnecessary). At the outboard end 116 of the clod conveyor 33 an operator may remove the good tomatoes from the clod conveyor 33 and let the dirt, clods, and the culled tomatoes simply fall off the end and pass down a chute 117, like that which has been shown in U.S. Pat. No. 4,118,311. The clod conveyor 33 is driven by power from the pump 24.

It will be noted how few connections are needed to secure in place the pickup unit 25, the clod conveyor 33, and the chute 117 to the main frame 40.

The separator unit 26 (FIGS. 1, 2, and 4–7)

The separator unit 26 may be a shaker device, like that shown in U.S. Pat. No. 4,088,570. This unit may be made so that it can be mounted with only four bolts onto pads 121, 122, 123, and 124 on the cross frame members 51 and 52, as shown in FIGS. 5–7. Hence, the entire unit 26 is easily removed for shipping, as can be the pickup unit 25, too, if that be desired. When the pickup unit 26 is removed, as shown in FIG. 4, it is clear that there are no obstructions or machinery below the separator unit 26.

When the separator unit 26 is in place, it includes a shaking device 125, and, below that a collecting conveyor 126 of the bar type through which loose dirt and trash can fall down to the ground without in any way gumming up any operating mechanism. Both the shaking device 125 and the collecting conveyor 126 are driven hydraulically with power from the pump 24. This collecting conveyor 126 then carries the collected tomatoes to the rear and deposits them on one of a pair of rear cross conveyors 27. The vines and trash carried by the shaker 125 is dumped out from end 127 of the separator unit 26 depositing the vines and remaining leaves, and so on, in the ground, substantially at the location where the vines were picked up.

The conveyor systems from the separator unit to the delivery unit (FIGS. 1 and 2)

Each cross conveyor 27 delivers its tomatoes transversely and transfers them to a forwardly moving conveyor 28. Various systems may be used, there may be a single forwardly moving conveyor on each side with the tomatoes being manually separated by operators, but generally it is preferable to use an automatic sorting device 31, such as is shown in U.S. Pat. No. 4,118,311, issued Oct. 3, 1978.

The mechanical sorter 31 may be followed by the upwardly and forwardly directed flighted conveyor 29 leading to another forwardly moving conveyor belt 30. On one side of the harvester 21 the conveyor 30 lies below the end portion of the clod conveyor 33.

At the forward end of these forward conveyors 30, the tomatoes are transferred to the front cross-conveyor 34.

Sorters may stand on the platform 32 provided for that purpose. The front cross conveyor 34 runs across the ends of both of the conveyors 30, receives their tomatoes, and deposits them on the delivery conveyor 35 which carries them up and out to deposit them in trailer bins or other collecting devices, as is conventional and is not shown here.

Each of the conveyors 27, 28, 29, 30, and 34 are separate units that are easily and readily mounted, detachably, on the frame 40, some super structure being usually provided for that purpose. They are all driven hydraulically by power from the pump 24. Similarly, the electromechanical sorters 31 and the platform 32 are mounted to the frame 40 in any suitable manner.

The tongue 22 (FIGS. 1 and 2)

The tongue 22 has an important, novel structure. To start with, it is shaped and assembled in any desirable manner to avoid conflict with any of the other parts of the harvester 21. It is made to pivot at each end in a horizontal plane, with a little play in a vertical plane.

Figure 10:
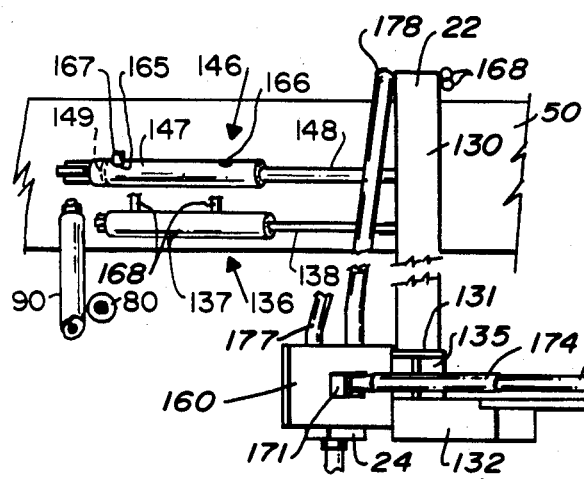
FIG. 10 is a view in end elevation of a portion of the tongue of FIG. 9 and adjacent parts of the harvester assembly, with some breaks.
Figure 11:
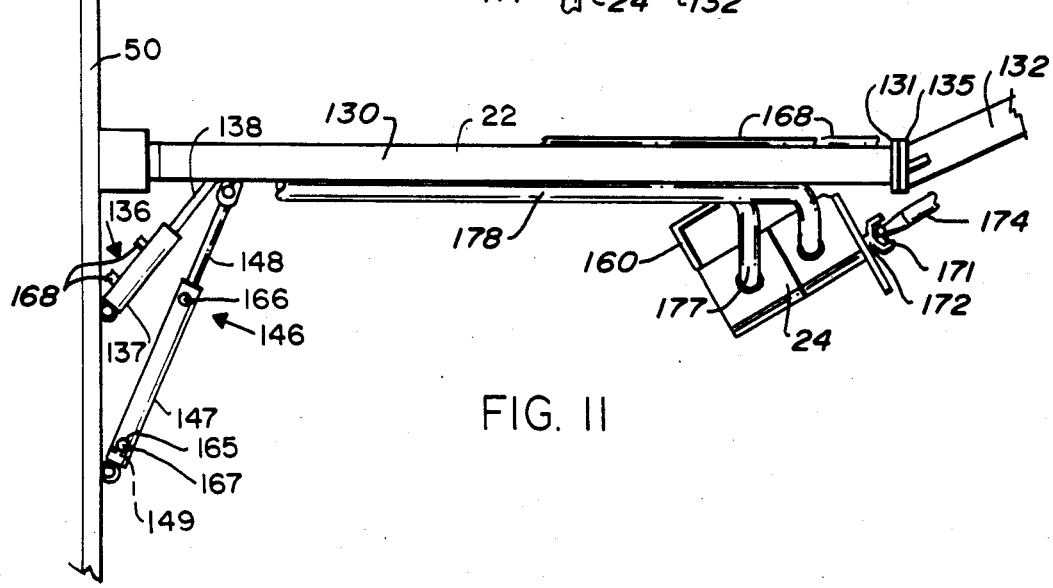
FIG. 11 is a top plan view looking down on FIG. 10.
Figure 12:
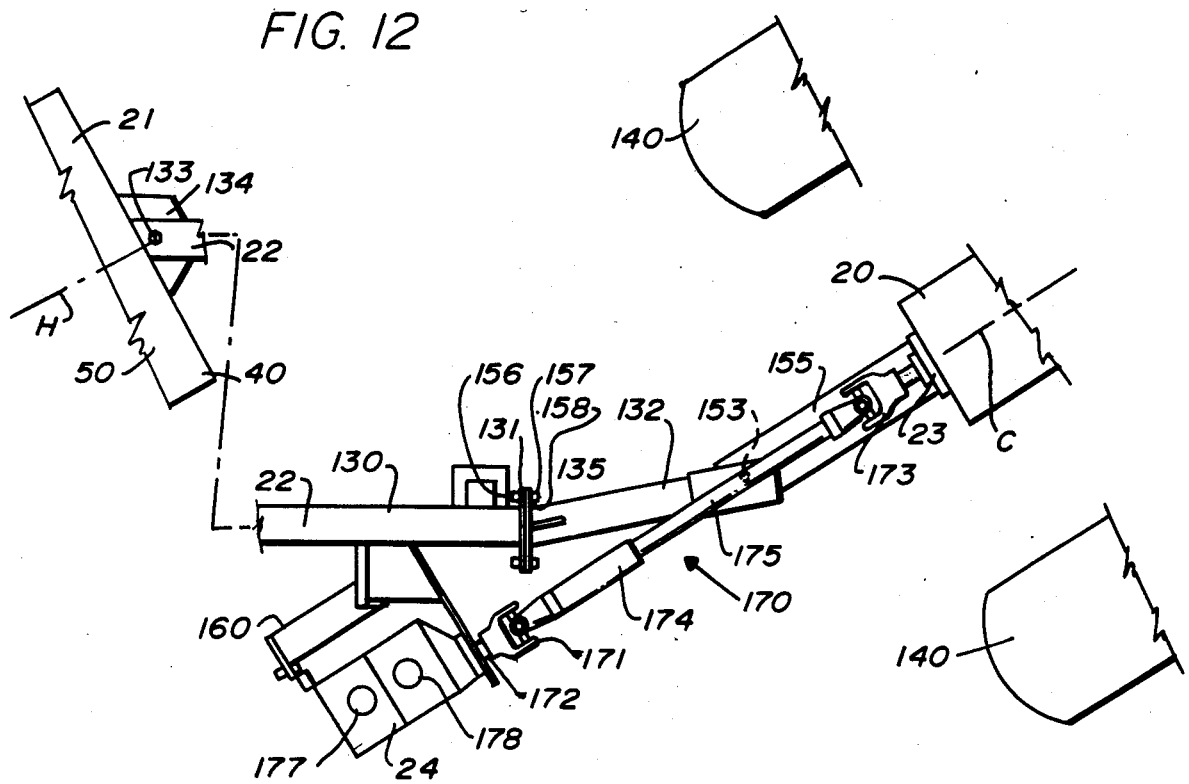
FIG. 12 is a plan view of the front portion of the tow arm and adjacent parts with parts of the tractor shown diagrammatically and, with a break, the rear portion of the tow arm and a portion of the harvester, with the harvester offset from the tractor and in its harvesting position.

The rear portion of the tongue 22 comprises a tow arm 130 (usually a composite of several individual pieces ending at the front in a cross plate 131, which joins a bracket 132 there. At its rear end, the tow arm 130 has a pivot pin 133 that fits a pad 134 on the front cross member 50 of the frame 40. The connections at each end may include a latching mechanism allowing some play but limiting the play to a small angle. The offset bracket 132 has a angular plate 135 that is secured to the plate 131. Usually the plate 13 will be inclined at an angle so that the offset bracket 132 meets the tow arm 130 at an obtuse angle. Near the rear end of the tow arm 130, a hydraulic apparatus 136 may have its cylinder 137 pivotally mounted to the harvester frame 40 and its piston rod 138 pivotally mounted to the tongue 22 (see FIGS. 10 and 11). The tractor 20 has its own hydraulic unit, near the transmission, and lines 168 from the cylinder 137 are connected thereto by a quick disconnect 169 at the rear of the tractor.

The tongue 22 is sufficiently long, so that while the harvester assembly 21 may trail directly behind the tractor 20 and span the same previously unharvested bed, the tractor 20 may also be offset by one bed on either side from the harvester assembly 21, so that the tractor 20 can run over an already harvested bed while the harvester assembly 21 proceeds along a bed that it then harvests.

The hydraulically powered generally horizontal cylinder 137, piston 136 arrangement, being pivotally attached at one end to the tow arm 130 and at the other end to the cross bar 50 of the main frame 40 enables shifting the relative lateral positions of the tractor 20 and the harvester assembly 21 from a position wherein the harvester assembly 21 is offset at least one full row to either side of the tractor 20 to a position wherein the harvester assembly 21 is generally aligned with the tractor 20 and to any position in between. As a result of this, the radius of turning of the tractor-harvester assembly combination can be reduced greatly for a turn in either direction, and the harvester assembly 21 can harvest one bed while the tractor 20 passes over an already harvested bed and therefore does not damage an unharvested bed.

Figure 18:
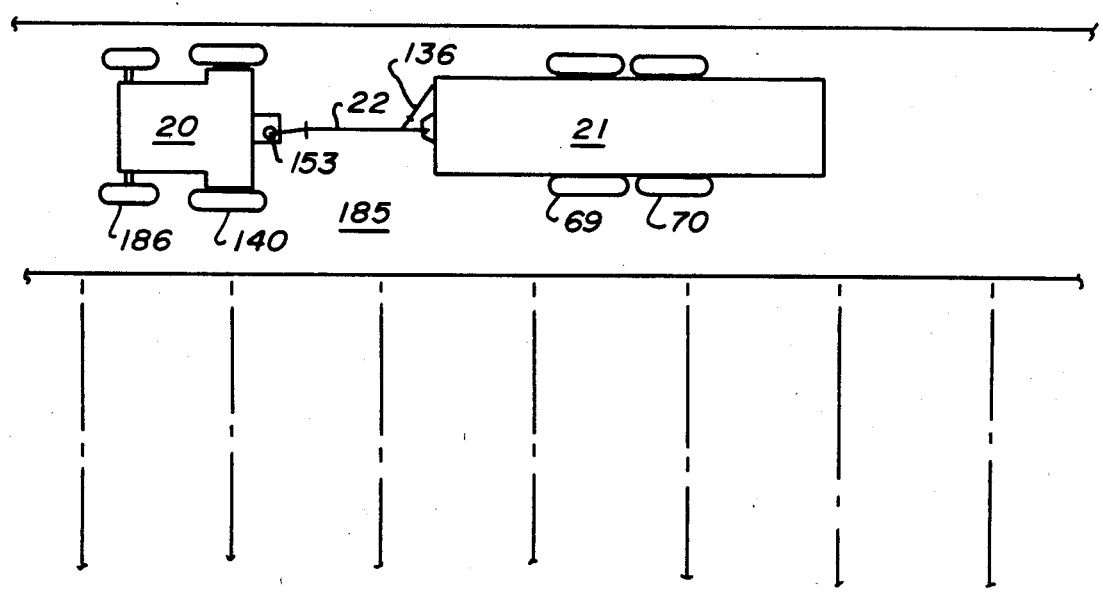
Figure 19:
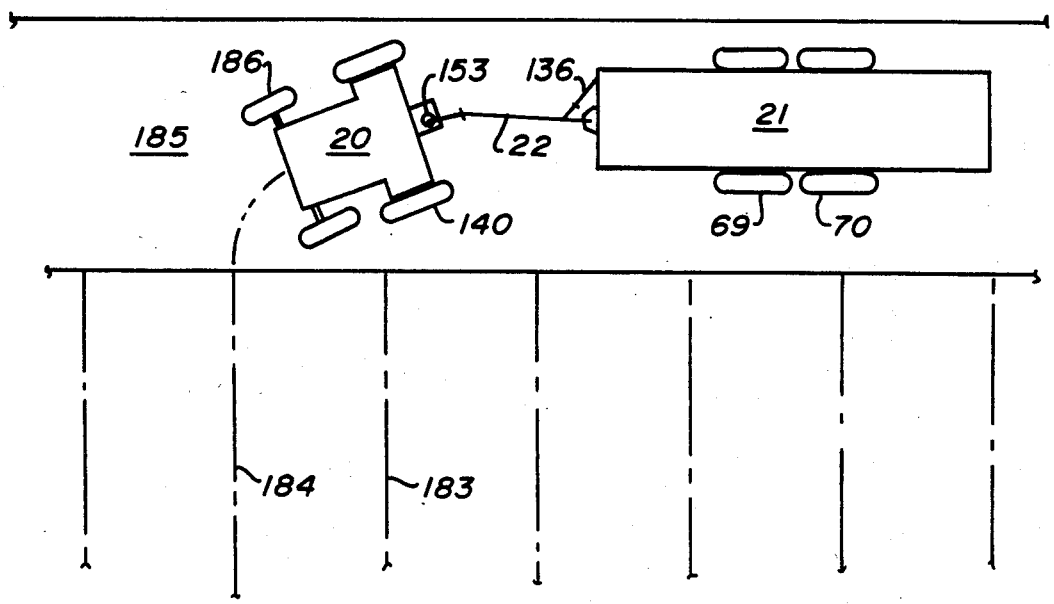

Thus, as shown in FIG. 2, and in FIGS. 18 and 19, the harvester assembly 21 may be towed to and from the field used in a straight forward position as shown, following substantially directly behind the tractor 20, with the centerline of the harvester assembly 21 substantially in line with that of the tractor 20.

When doing harvesting in the field, the harvester assembly 21 may follow the tractor 20 in its offset harvesting position, one row to the left with its centerline parallel to that of the tractor 20. (See FIGS. 1, 16, and 20.) (If desired, the offset may, of course, be to the right, but usually harvesters are made to deliver the tomatoes to the right, as indicated in FIGS. 1 and 2, so such a change would have to be made at the factory.)

As shown diagrammatically in FIG. 2, the tractor's wheels 140 can run in furrows 141, 142 on each side of a bed 143 which has already been harvested, while the harvester's wheels 69 and 70 run in the furrows 142 and 144 on each side of a bed 145 being harvested, one furrow 142 being shared in common by the beds 143 and 145. Thus, the bed 145 being harvested is not at all subject to damage it would receive were the tractor 20 to run over it. The straight-ahead linkage is used when moving the harvester around on roads, headlands, or other relatively narrow passages. The bed 143 is either a previously harvested bed or an empty space provided to get things started at one or both sides of the field.

The movement between the straight-ahead position of the linkage and the offset position of the linkage is accomplished with the aid of the hydraulic linkage 136 (See FIGS. 1 and 9–11), which is connected to the tractor's hydraulic system through the power lines 168 and which is operated by a suitable control lever either by the tractor driver or by an operator on the platform 105 in the box-like structure 106. To simplify operations and provide stops and locks, there is preferably a telescoping assembly 146, comprising an outer cylinder 147 pivoted to the harvester frame 40 and an inner cylinder 148 pivoted to the tongue 22. The assembly 146 is preferably made suitable for the widest row spacing (e.g., 66" between furrows) to be used, and a short insert spacer 149 is placed in the inner end of the outer cylinder 147 when a shorter row spacing (e.g. 60" between furrows) is to be used.

Holes 165 and 166 are provided in both cylinders 147 and 148, so that a pin 167 can be dropped into the holes 165 to retain the assembly 146 in the exact extended position for use when harvesting at the offset position or can be dropped into the holes 166 when the tractor 20 is to be followed directly in line by the harvester 21, as when moving them along a road. The locking pin 167, when used, enables release of the hydraulic apparatus 136 and reliance solely on the mechanical linkage thereby set up. When unlocked, the cylinder 147, with or without the spacer 149, enables the hydraulic apparatus 136 to extend until the solid end of the inner cylinder 148 abuts the inner end of the outer cylinder 147 or the spacer 149, which then automatically prevents further extension of the hydraulic apparatus 136.

The non-powered telescoping assembly 147, 148, which is pivotally attached at one end to the cross bar 50 of the main frame 40 and at the other end to the tow bar 131, limits the maximum extension of said cylinder-piston assembly 136. This telescoping assembly 147, 148, with its specially located holes 165 and 166 through its telescoping members and the removable pin 16 for use therewith, enables one to lock the telescoping assembly 147, 148 in a position where said harvester assembly 21 is offset from the tractor 20, for harvesting, or in a position axially in line with the tractor 20 for non-harvesting towing. Thus, when the locking pin 167 is in place, hydraulic pressure need not be applied to the cylinder-piston assembly 136.

The front end of the offset bracket 132 is provided with a pivot ball 153 that fits in a suitable concave bearing 154 of a rigid draw bar 155 that extends rearwardly from the tractor 20 along the longitudinal axis C of the tractor 20.

At the connections between the plates 131 and 135, suitable adjusting apparatus are provided. There may include stationary studs 156 on one member and vertically lengthened slots 157 on the other plate, with nuts 158. This adjusting apparatus enables the harvester assembly 21 to be approximately leveled with the tractor 20.

Near its forward end, the tow arm 130 may support the pump 24 by means of a pump supporting bracket 160. The bracket 160 may be connected to the tow arm 130 by a pair of plates 161 and 162 with adjustment studs 163 and slots 164 for vertical adjustment of the pump 24 relative to the power take off unit 23 of the tractor 20, (see FIG. 9).

The pump 24 has a longitudinally rigid drive line 170, at one end, which is mounted on a universal or swivel joint 171 to the rotary drive shaft 172 of the pump 24 and on the other end, to a universal joint 173 of the power take-off unit 23 of the tractor 20. The drive line 170 includes an outer sleeve 174 and an inner shaft 175 that telescope for automatically lengthening and shortening the drive line 170.

As stated before, it is important, in order to prevent wear and break down in the field, to have the drive line 170 almost exactly in line with the power take-off 23 of the tractor and the drive shaft 172 of the pump. The power take-off 23 drives the shaft 172 only during harvesting. During harvesting, the pump 24 is operating and controls nearly all the moving parts of the pickup and separator, the sorting conveyors, the other conveyors, and the delivery mechanism, and it also is used to control other moving parts.

However, when the tractor is not harvesting—whether it is towed in line with the tractor, or whether it be moved around a turn, either to the left or to the right—the pump 24 is not operated. The tractor driver has a warning device at his dashboard area to give a warning when the pump is one so that he can turn off the power take-off 23 at any time other than when harvesting is proceeding.

The purpose of the telescoping members 174 and 175 of the drive line is to enable the harvester to be moved relative to the position of the tractor, or vice versa, at times when the pump 24 is not being driven by the power take-off 23. The use of the offset bracket enables tying the tongue 22 to the tractor 20 at the pivot point 153, 154, while still making it possible to have the drive line 170 place the pump drive shaft 172 in accurate alignment with the power take-off member 23. At other times during the maneuvers, the combination of the tongue, with its tow arm 130 and offset bracket 132, and the telscoping drive line 170, enables the maneuvering of the tractor. This can be seen in FIGS. 13–16.

Figure 13:
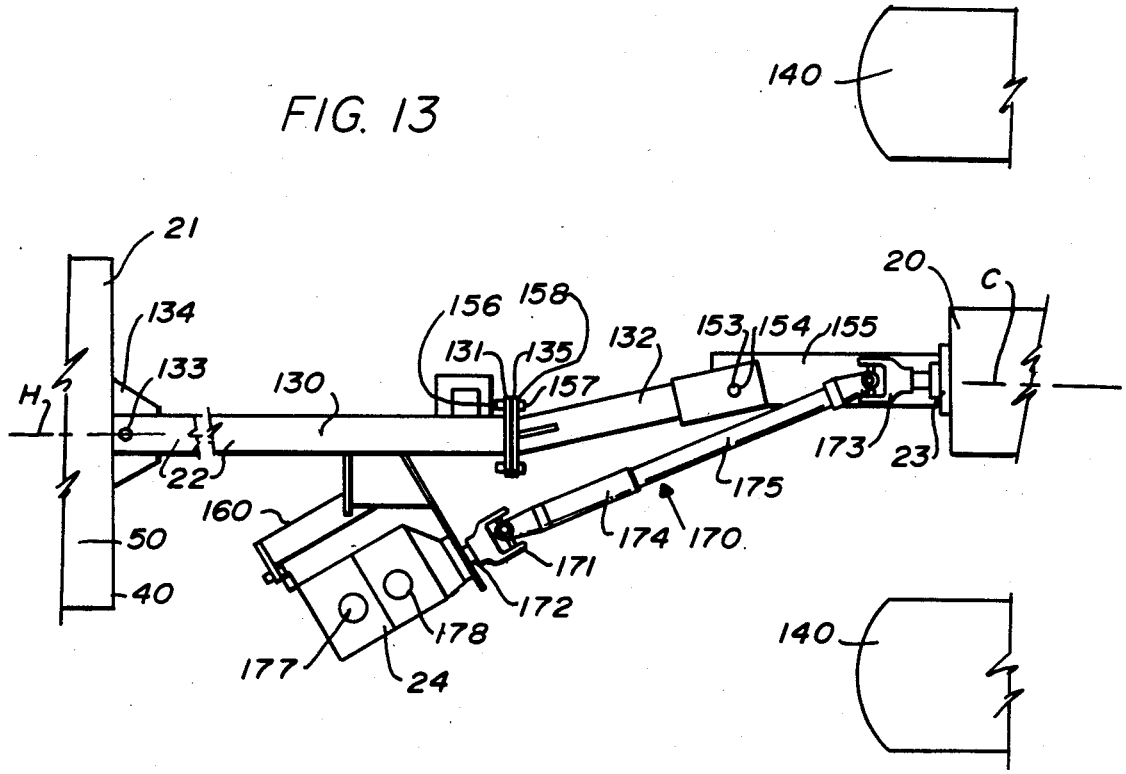
FIG. 13 is a similar view with the harvester in towing position substantially directly behind the tractor.

FIG. 13 shows the towing position when the harvester 21 is being pulled directly behind the tractor 20. There may be a slight offset of the harvester's centerline H from the tractor's centerline C at this time of two or three inches, but not enough to matter. It will be seen that in this position the drive line 170 has slightly telescoped and has rotated about the swivels 171 and 173. However, no wear of any substance because the drive line 170 is not rotating, and the power take-off 23 is then inoperative.

Figure 14:
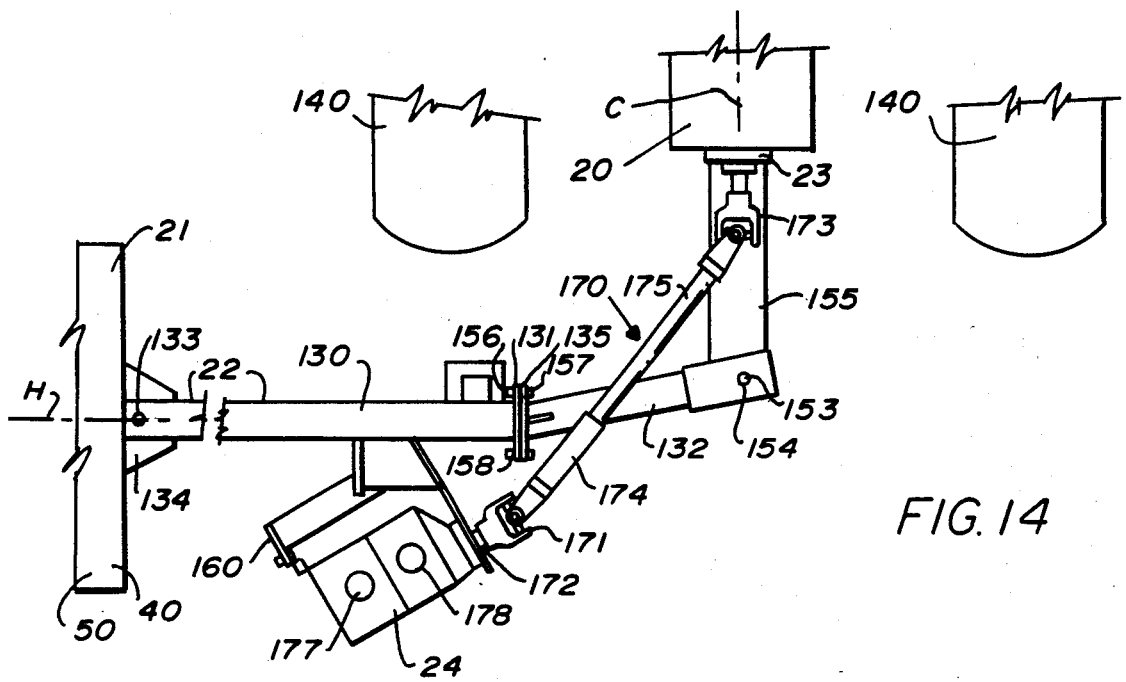
FIG. 14 is a similar view with the tractor making a left-turn and the harvester near its exteme position for such a turn.

FIG. 14 shows an extreme position of the harvester relative to the tractor, which is achieved during the making of a left turn. Left turns are more common than right turns. In this position the drive line 170 crosses over the offset bracket 132, and that the power take-off 23 is at about a 75 or 80 degree angle to the pump's drive shaft 172. Since the shaft 172 is not being driven going on at this time, that does not matter. In this position, the centerline H of the harvester is at approximately a right angle to the centerline C of the tractor 20.

Figure 15:
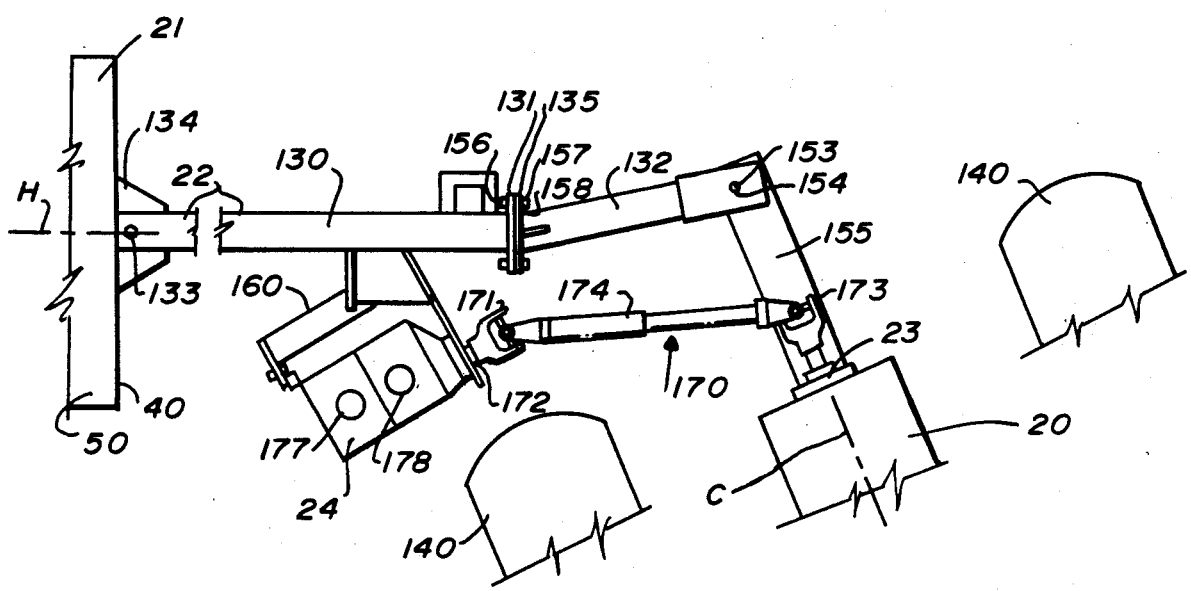
FIG. 15. is a similar view with the tractor making a right turn and the harvester near its extreme position for such a turn.

FIG. 15 shows the extreme position during a right turn. Right turns are made more rarely, but are used at times when the tractor 20 must avoid trees or something of that nature at the ends of a field, or during other such maneuvers. In this position the tongue 22 approaches a right angle with the tractor's tow arm 155. In other words, the centerline H is at somewhat less than but approaching a right angle to the centerline C of the tractor 20.

The hydraulic system

The harvester 21 includes a large hydraulic fluid cooling device 150 (FIG. 1) mounted at the rear of the main beam member 41, which is therefore longer than the beam 42 on the other side. Also, at the forward end of that same beam is mounted a hydraulic fluid supply tank 151, which normally has a capacity of about 50 gallons. These devices 150 and 151 are preferably made so that they can serve as counter weights relative to other machinery and are mounted on the harvester unit 21 rather than the tractor. The hydraulic conduits are connected to suitable pressure and return manifolds. The large pump 24 sends the fluid via conduits 177 and 178 from the tank 151 to the inlet or pressure manifold, from which conduits go via suitable on-off, pressure limiting valves to the various units needing power, including the cutting sickle 77, the motors for the elevating conveyor 110 of the pickup unit 25, the crank of the separator unit 26, the collecting conveyor 126, the rear cross conveyors 27, the front cross conveyors 34, the forwardly moving conveyors 28, 29, and 30, and the other moving mechanisms on the harvester assembly 21. The pump 24, powered by the power take-off unit 23 of the tractor 20 has recirculation and cooling as needed. The tractor 20 itself does not have to be burdened with either the storage tank 151 for the large amount of additional fluid needed by this hydraulic system, or the cooling device 150.

Some general features

A typical large harvester assembly 21 of this invention can weight about 17,500 pounds, of which about 15,400 pounds is borne by the wheels 69 and 70 and about 2,100 bears on the tongue 22.

The width in the field is about fourteen feet-six inches, which when transported can be narrow to below twelve feet, both widths excluding the delivery elevator. The height of the entire assembly 21 can be about 9½ feet per shipping and, in the field with the elevator folded, about 12¼ feet. The tread width is adjustable from five to five and one-half feet.

Maneuvering the tractor-harvester combination (FIGS. 16–20)

Figure 16:
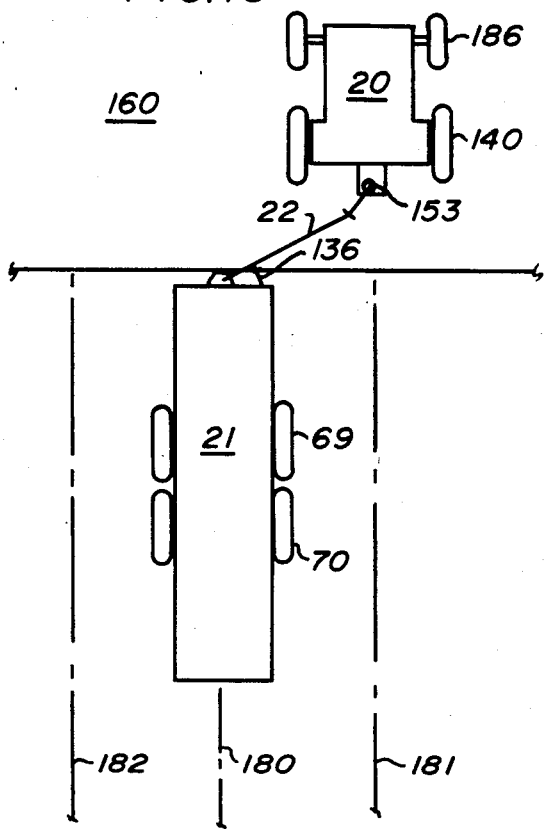
FIGS. 16–20 are diagrammatic views of a tractor and harvester of this invention making a turn to go from the end of a first-harvested row to the beginning of the next row to be harvested.

The series of views comprising FIGS. 16–20 illustrate diagrammatically how the combination of the tractor 20 and the harvester assembly 21 can operate in a restricted end of the field space just after completing the harvesting of a row 180. They illustrate the maneuverability of the combination made possible by its structure. On the right of the row 180, there is an already-harvested row 181 along which the tractor 20 has been moving (FIG. 16). To the left of the row 180 is an unharvested row 182 which must not be damaged.

The harvesting preferably operates on outside rows first and gradually works in from each side of the field. Therefore, the row 182 will not (usually) be harvested next, but a row 183 (FIGS. 19 and 20) (which may be close or may be some distance away) will be the next to be harvested. To the left of the row 183 is an already-harvested row 184, down which the tractor 20 will move. In between the rows 182 and 183 are the other unharvested rows.

At the ends of the rows are headlands 185 (see especially FIGS. 18 and 19) down which the tractor 20 and harvester 21 will move. The headlands 185 are the length of the planted area but are preferably narrow, since they represent loss in planted acreage. The present invention enables them to be very narrow.

As shown in FIG. 16, the tractor 20 is offset one row from the harvester 21 and the tongue 22. The tractor's rear wheels 140 have been running in the furrows on each side of the row 181, and so have its front wheels 186, the only wheels of the combination that can be turned, for the wheels 140 are always in alignment with the fore-to-aft axis of the tractor 20, and the wheels 69 and 70 of the harvester assembly 21 are always in alignment with the fore-to-aft axis of the harvester assembly 21. During harvesting of the row 180, the tongue 22 has been retained at its proper angle by the hydraulic assembly 136 and the shock-absorbing alignment assembly 144 (the latter not being shown in FIGS. 16–20 to avoid complications). The assembly 136 is in a retracted position at this time.

Figure 17:
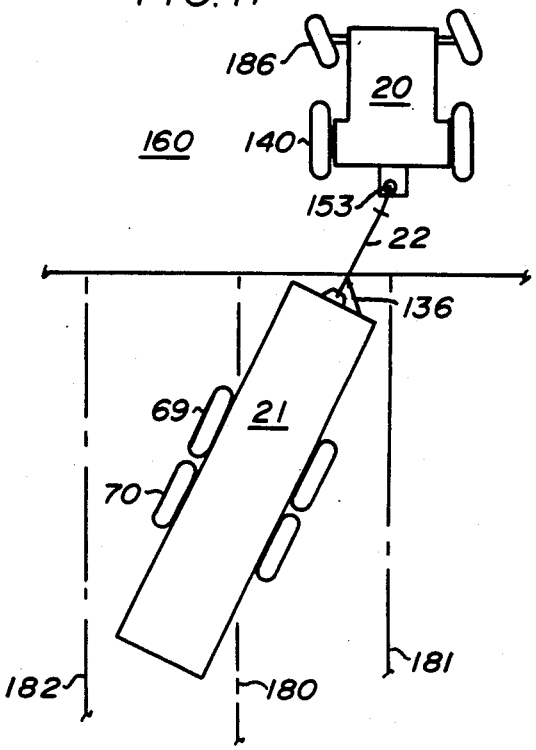

To get the harvester 21 out of the row 180 without damaging the unharvested row 182 to its left, the tractor 20 begins to move forward and in a left turn as in shown in FIG. 17, when the wheels 186 have been turned. At this time, the hydraulic device 136 is extended to move the tongue 22 from an acute angle (FIG. 16) with the transverse front end of the harvester 21 (on the side to which the device 136 is affixed) to an obtuse angle (FIG. 17). The wheels 69 and 70 never more to the left but gradually move to the right as the combination moves forwardly.

By the time the position of FIG. 18 has been reached, the tractor 20 has completed its 90° turn to the left and the harvester 21 has passed through a larger angle, with the aid of the hydraulic assembly 136 which is at first extended greatly and then is retracted somewhat as the position of direct following is reached in FIG. 18, where the angle between the tongue and the front end of the harvester 21 is now a right angle. There is not offset; so only a narrow headland 185 is required.

In FIG. 19, the tractor 20 turns to enter the row 184 by first going slightly past it and then turning back at a little more than 90°. The hydraulic device 136 is first lengthened and then gradually shortened until it reaches the position in FIG. 20 where the harvester 21 is offset from the tractor 20 by one row, going into the row 183.

Figure 20:
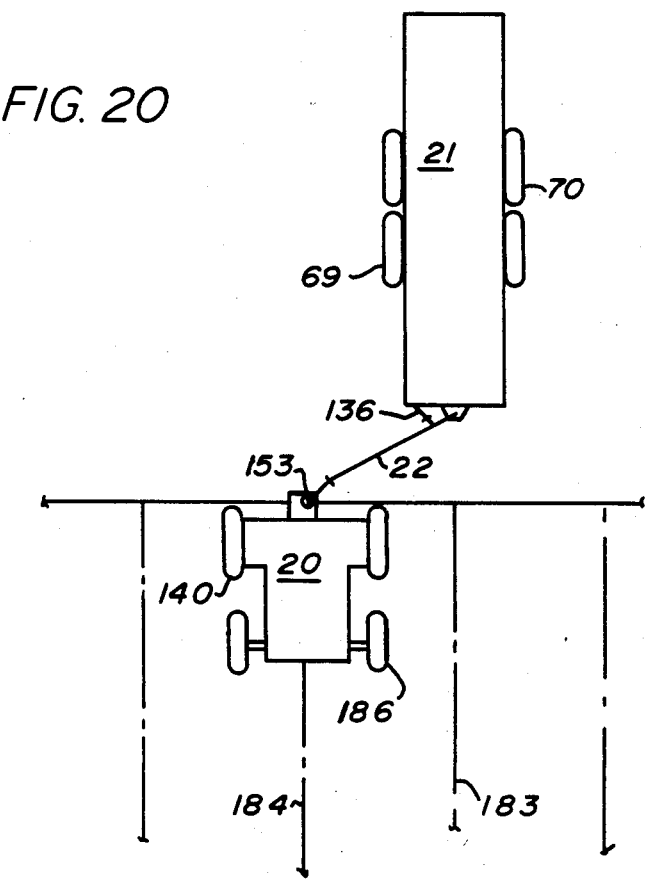

The position in FIG. 20 is 180° from the position in FIG. 16 and has been accomplished in a very limited space.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

What is claimed is:

1. A single-row tomato harvester for harvesting a row crop planted in parallel beds of identical width defined on each side by a furrow, including in combination:

a tractor fully supported on its own wheels, the wheels being spaced apart widthwise at a distance sufficient to bridge a previously harvested bed and ride in its furrows, said tractor having its own motive power and its own hydraulic pump plus a power take-off unit along the tractor's longitudinal centerline and a rigid draw bar extending rearwardly from the rear of said tractor along the tractor's longitudinal centerline and having a rear end, a harvester assembly having no motive power and having a main frame partially supported on wheels spaced apart widthwise at substantially the same distance as those of the tractor, and having a series of hydraulically powered means, said harvester being offset by one bed from said tractor during harvesting, a tongue pivotally attached at its rear end to the center of the front end of said main frame and detachably pivotally attached at its front end to said tractor, a pump-supporting bracket supported by said tongue, a hydraulic pump supported by said bracket, for operating said series of powered means, said pump having a rotary shaft, a longitudinally rigid drive line, swivel mounted to said pump's rotary shaft and to said power take-off unit of said tractor, said drive line including telescoping means for automatically lengthening and shortening said drive line, said drive line lying along the centerline of the tractor during said offset harvesting, and hydraulically powered generally horizontal cylinder-piston means pivotally attached at one end to said tongue and at the other end to said main frame for shifting the relative lateral position of said harvester assembly to said tractor from a position wherein said harvester assembly is offset at least one full row to one side of the tractor to a position wherein said harvester assembly is aligned with the tractor, and to full left turn and full right turn positions where said tractor centerline and the harvester assembly centerline are approximately perpendicular to each other and to any position in between, whereby the radius of turning of the tractor-harvester assembly combination is reduced greatly for a turn in either direction.

2. The harvester of claim 1 having a non-powered telescoping assembly pivotally attached at one end to said main frame and at the other end to said tow arm, to limit the maximum extension of said cylinder-piston assembly, said telescoping assembly also comprising specially located holes through its telescoping members and a removable pin for use therewith to lock said telescoping assembly in the position where said harvester assembly is properly offset from said tractor for harvesting, whereby when said locking pin is in place, hydraulic pressure need not be applied to said cylinder-piston assembly.

3. The harvester of claim 2 wherein said pin can extend through another hole in another position substantially axially in line with said tractor for non-harvesting towing.

4. The harvester of claim 1, wherein said tongue comprises a tow arm, being the part of said tongue that is pivotally attached to said main frame, extending forwardly from the front of said harvester assembly generally along the assembly's longitudinal centerline, and an offset coupler bracket pivotally attached to said draw bar closely adjacent to the rear end of the draw bar, and rigidly attached to the front end of said tow arm at an obtuse angle to provide a suitable offset relatively to the longitudinal axis of the tow arm and relatively to the draw bar.

5. The harvester of claim 4 having adjustment means at said offset coupler bracket for making vertical adjustments to level said harvester with respect to said tractor.

6. The harvester of claim 1 having connecting means for connecting said pump-supporting bracket to said tow arm and for adjusting that bracket's position relative to said tow arm, for positioning said pump relative to said power-take-off unit.

7. A single-row tomato harvester for harvesting a row crop planted in parallel beds of identical width defined on each side by a furrow, including in combination:

a tractor fully supported on its own wheels, the wheels being spaced apart widthwise at a distance sufficient to bridge a planted and previously harvested bed and ride in its furrows, said tractor having its own motive power and its own hydraulic pump plus a power take-off unit along the tractor's longitudinal centerline, and a rigid draw bar extending rearwardly from the rear of said tractor along the tractor's longitudinal centerline and having a rear end, a harvester assembly having no motive power and having a main frame partially supported on wheels spaced apart widthwise at substantially the same distance as those of the tractor, and to be offset from said tractor by one bed during harvesting, said harvesting usually having powered pickup means, powered separator means and powered conveyor means supported by said main frame, hydraulic means on said harvester assembly for operating all said powered means, including a pump having a rotary shaft detachably connected to said tractor power-take-off unit, a tongue pivotally attached at its rear end to the center of the front end of said main frame and detachably pivotally attached at its front end to said tractor and comprising the sole structural member tying together said harvester assembly and said tractor, adjustment means on said tongue for making vertical adjustments to level said harvester with respect to said tractor, a pump-supporting bracket, said harvester pump being supported by said bracket, connecting means for connecting said pump-supporting bracket to said tongue and for adjusting that bracket's position relative to said tongue for positioning said pump so that in the offset harvesting position said pump is directly in line with said power-take-off unit along the centerline of the tractor, and a longitudinally rigid drive line, swivel mounted to said rotary shaft and to said power take-off unit of said tractor, said drive line including telescoping means for automatically lengthening and shortening said drive line, said drive line lying along the centerline of the tractor during offset harvesting, said tongue being sufficiently long, so that while said harvester assembly may at times trail directly behind said tractor said harvester assembly, may also be offset by one bed on one side of said tractor so that while the tractor can run over an already harvested bed, the harvester assembly proceeds along an adjacent previously unharvested bed that it then harvests, and hydraulically powered generally horizontal cylinder-piston means connected via a quick disconnect line to the hydraulic pump of the tractor and pivotally attached at one end to said tongue and at the other end to said main frame for shifting the relative lateral position of said harvester assembly to said tractor from a position wherein said harvester assembly is offset at least one full row to one side of the tractor to a position wherein said harvester assembly is aligned with the tractor, and to any position in between, whereby the radius of turning of the tractor-harvester assembly combination is reduced greatly for a turn in either direction and whereby the harvester assembly can harvest one bed while the tractor passes over an adjacent already harvested bed and therefore does not damage an unharvested bed.

8. The harvester of claim 7 having a non-powered telescoping assembly pivotally attached at one end to said main frame and at the other end to said tongue, to limit the maximum extension of said cylinder-piston assembly, said telescoping assembly also comprising specially located holes through its telescoping members and a removable pin for use therewith to lock said telescoping assembly in the position where said harvester assembly is offset from said tractor for harvesting, whereby when said locking pin is in place, hydraulic pressure need not be applied to said cylinder-piston assembly.

9. The harvester of claim 8 wherein said pin may be used with a different hole to lock said telescoping assembly in a position substantially axially in line with said tractor for non-harvesting towing.

10. The harvester of claim 7 wherein said tongue comprises a tow arm, being the part of said tongue that is pivotally attached to said main frame, extending forwardly from the front of said harvester assembly generally along the assembly's longitudinal centerline but diverging from it at a small angle, and having a front end, an offset coupler bracket pivotally attached to said draw bar closely adjacent to the rear end of the draw bar, and rigidly attached to the front end of said tow arm, at an obtuse angle to provide a suitable offset relative to the longitudinal axis of the tow arm and relative to the draw bar.

11. The harvester of claim 7 in which said main frame is made up of two parallel longitudinal beams, one on each side of said assembly, spaced apart from each other and each having front and rear ends, and three transverse cross members joined to said beams and spaced apart from each other, there being a front cross member adjacent to the front end of said frame, a rear cross member adjacent to the rear end, and an intermediate cross member between them, all said beams and cross members being approximately on the same horizontal plane, brackets secured to said beams in transverse alignment with each other and extending down below said beams, a pair of truck assemblies pivotally secured to said brackets are having said wheels for support of said main frame located entirely below the horizontal plane of said main frame, each wheel being rotatably mounted on a stub shaft, there being no axles, shafts or other cross members extending cross said frame below said frame cross members.

12. The harvester of claim 11 wherein said pickup unit is pivotally attached to said main frame at the front end thereof and extending forwardly from it and having cutting means at the forward end and elevating means extending rearwardly and upwardly therefrom, support pillars extending upwardly from said beams adjacent to said intermediate cross member and through which said pickup is pivotally attached to said main frame, the power means for raising and lowering the front end of said pickup unit being pivotally secured to said main frame and to said pickup unit.

13. The harvester of claim 11 wherein said main frame includes only said two beams and said three cross members.

14. The harvester of claim 13 wherein said pickup means and said separator means lie between said beams, which said conveyor means include a conveyor and sorting system comprising a series of conveyor units each secured to said main frame and providing means outboard of said beams for conveying the separated tomatoes from the rear of said separating unit back on each side of said separator unit past sorting means suported outboard of said conveyor units by said main frame for culling the tomatoes and to delivery means to the front end of said harvester, forward of said separator unit, and above said front cross beam, thereby shortening the harvester length.

15. The harvester of claim 7 having automatic height control means on said harvester assembly, including an instantaneous vertical distance-determining device mounted on said pickup unit to the rear of said cutting means, for automatically actuating and controlling said power means to maintain said cutting means at a substantially constant depth below ground without action of the operator of said tractor.

* * * * *